US009614684B2

(12) United States Patent
Cooley

(10) Patent No.: US 9,614,684 B2
(45) Date of Patent: Apr. 4, 2017

(54) EXTERNAL INDEXING AND SEARCH FOR A SECURE CLOUD COLLABORATION SYSTEM

(71) Applicant: Cisco Technology, Inc., San Jose, CA (US)

(72) Inventor: Shaun Cooley, El Segundo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/151,864

(22) Filed: May 11, 2016

(65) Prior Publication Data

US 2016/0254917 A1 Sep. 1, 2016

Related U.S. Application Data

(62) Division of application No. 14/225,636, filed on Mar. 26, 2014, now Pat. No. 9,363,243.

(51) Int. Cl.
| | |
|---|---|
| *H04L 29/06* | (2006.01) |
| *H04L 9/32* | (2006.01) |
| *H04L 29/08* | (2006.01) |
| *G06F 17/30* | (2006.01) |

(Continued)

(52) U.S. Cl.
CPC ........ *H04L 9/3263* (2013.01); *G06F 17/3048* (2013.01); *G06F 17/30371* (2013.01); *G06F 17/30864* (2013.01); *G06F 17/30867* (2013.01); *H04L 9/14* (2013.01); *H04L 9/30* (2013.01); *H04L 63/0428* (2013.01);
(Continued)

(58) Field of Classification Search
CPC .................................................... H04L 9/3263
See application file for complete search history.

(56) References Cited

U.S. PATENT DOCUMENTS

| | | |
|---|---|---|
| 7,676,507 B2 | 3/2010 | Maim |
| 8,635,456 B2 | 1/2014 | Fascenda |
| 8,762,712 B1 | 6/2014 | Kwan et al. |

(Continued)

OTHER PUBLICATIONS

"Conversation relationship graph to facilitate collaboration in a globalized work environment", Sep. 15, 2013. Retrieved from: file:///C:/Users/mrahman3/Documents/e-Red%20Folder/15151864/IPCOM000230849D.pdf.*

(Continued)

*Primary Examiner* — Shawnchoy Rahman
(74) *Attorney, Agent, or Firm* — Edell, Shapiro & Finnan, LLC

(57) ABSTRACT

An end-to-end secure cloud-hosted collaboration service is provided with a hybrid cloud/on-premise index and search capability. This approach includes on-premise indexing and search handling, while relying on the cloud for persistent storage and search of the index. The on-premise indexer receives a copy of an encrypted message from the cloud-hosted collaboration service. The encrypted message has been encrypted with a conversation key. The indexer receives the conversation key from an on-premise key management service, and decrypts the encrypted message with the conversation key. A set of tokens are extracted from the decrypted message, and subsequently encrypted with a secret key, different than the conversation key, to generate a first set of encrypted tokens. The first set of encrypted tokens is transmitted for storage in a search index on the cloud-hosted collaboration service.

20 Claims, 10 Drawing Sheets

(51) Int. Cl.
*H04L 9/14* (2006.01)
*H04L 9/30* (2006.01)

(52) U.S. Cl.
CPC .......... *H04L 63/06* (2013.01); *H04L 63/061* (2013.01); *H04L 67/1097* (2013.01)

(56) References Cited

U.S. PATENT DOCUMENTS

| | | | |
|---|---|---|---|
| 9,197,419 B1* | 11/2015 | Chandrasekhar | G06F 21/602 |
| 2002/0194470 A1 | 12/2002 | Grupe | |
| 2010/0014676 A1 | 1/2010 | McCarthy et al. | |
| 2011/0107088 A1* | 5/2011 | Eng | G06Q 10/10 |
| | | | 713/155 |
| 2011/0179427 A1* | 7/2011 | Krishnamoorthy | G06F 9/541 |
| | | | 719/328 |
| 2012/0185693 A1 | 7/2012 | Chen et al. | |
| 2012/0284516 A1* | 11/2012 | Errico | G06F 21/32 |
| | | | 713/168 |
| 2013/0262863 A1 | 10/2013 | Yoshino et al. | |
| 2013/0283060 A1 | 10/2013 | Kulkarni et al. | |
| 2013/0339722 A1 | 12/2013 | Krendelev et al. | |
| 2014/0372752 A1* | 12/2014 | Sallis | G06F 21/32 |
| | | | 713/165 |
| 2015/0244684 A1 | 8/2015 | Ng et al. | |
| 2015/0281184 A1 | 10/2015 | Cooley | |
| 2015/0281185 A1* | 10/2015 | Cooley | H04L 63/0428 |
| | | | 713/171 |

OTHER PUBLICATIONS

Perspecsys, "Cloud Data Encryption Primer-Cloud Data Encryption and SaaS Security", retrieved from http://perspecsys.com/resources/cloud-encryption-primer/, on Jan. 24, 2014, pp. 1-6.
MIT Kerberos Consortium, "The Role of Kerberos in Modern Information Systems," retrieved from www.kerberos.org/software/rolekerberos.pdf, on Mar. 26, 2014, pp. 1-53.
Extended European Search Report in counterpart European Application No. 15159944.6, dated Aug. 19, 2015, 6 pages.

* cited by examiner

EXTERNAL INDEXING AND SEARCH FOR A SECURE CLOUD COLLABORATION SYSTEM

CROSS REFERENCE TO RELATED APPLICATIONS

This application is a divisional of U.S. patent application Ser. No. 14/225,636, filed Mar. 26, 2014, entitled "External Indexing and Search for a Secure Cloud Collaboration System," the contents of which are hereby incorporated by reference.

TECHNICAL FIELD

The present disclosure relates to providing secure indexing and search capabilities for cloud based collaboration system.

BACKGROUND

Online collaboration systems allow participants from around the world to communicate and share ideas. To enable scalable solutions, a collaboration system may transition away from premise deployed infrastructure, signaling, and media control to cloud hosted services. However, customers may be hesitant to switch to cloud-hosted services due to perceived loss of control around security and privacy of the collaboration data. This perception may be exacerbated by the fact that collaboration products may carry highly confidential customer information in an easily digestible format (e.g., text, voice, video, electronic documents).

DESCRIPTION OF EXAMPLE EMBODIMENTS

Overview

The embodiments presented herein provide for a method comprising receiving a copy of an encrypted message from a cloud hosted collaboration service. The encrypted message has been encrypted with a conversation key. The method further comprises receiving the conversation key from an on-premise key management service, and decrypting the encrypted message with the conversation key. A set of tokens are extracted from the decrypted message, and subsequently encrypted with a secret key, different than the conversation key, to generate a first set of encrypted tokens. The first set of encrypted tokens is transmitted for storage in a search index on the cloud hosted collaboration service.

Example Embodiments

With the inherently remote nature of cloud hosted services, customers may be concerned about the privacy and security of data, such as data generated by cloud-based collaboration services. One example of a solution to ensure privacy and security in a cloud-hosted collaboration system may be to give customers on-premise control of the cryptographic keys used in establishing secure end-to-end communication session between client devices. In this way, the customer can maintain control over the security and privacy of the communications, while allowing the cloud-hosted system to handle the large scale issues of distribution, high availability, message delivery, and archiving. Additionally, the cloud-based service may allow for search indexing of a collaboration session, also called a conversation hereinafter, maintaining a scalable search index encrypted in the cloud.

Figure 1:
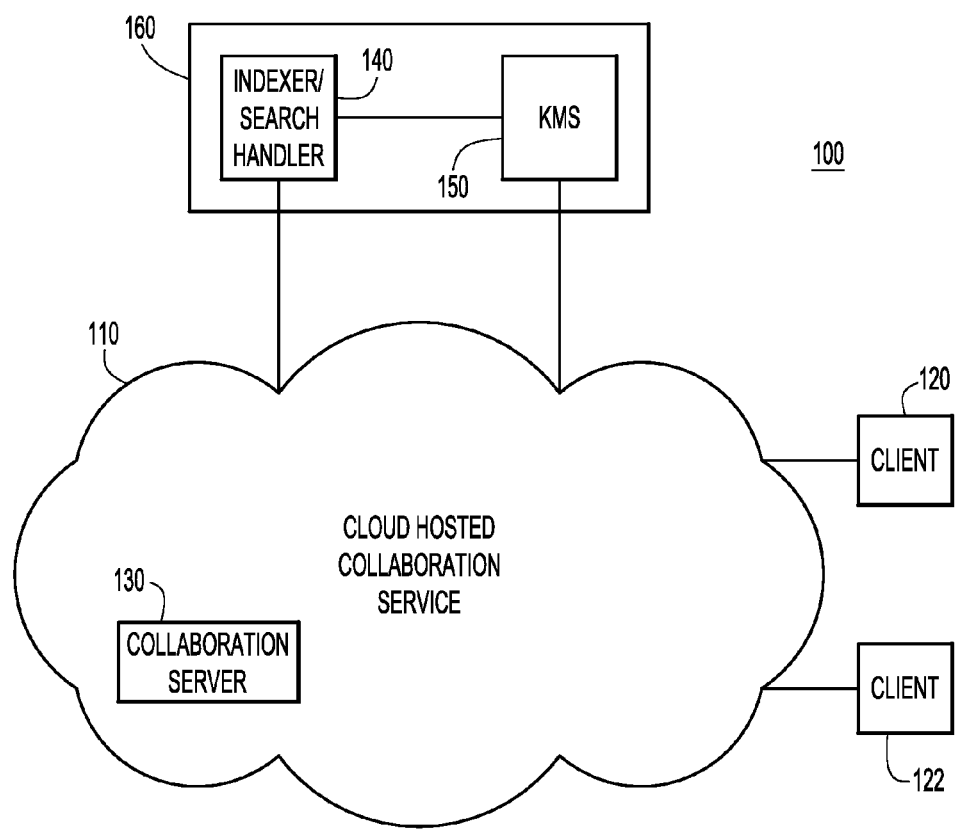
FIG. 1 is a block diagram of a system of devices configured to participate in an online collaboration session according to an example embodiment.

Referring to FIG. 1, an online conference system 100 is shown that enables a cloud-hosted collaboration service (CHCS) 110 to facilitate an online collaboration session (e.g., a web meeting, conversation, etc.) between client devices 120 and 122. Collaboration server 130 is provided to facilitate the conversation, and may comprise a plurality of servers as needed by the CHCS 110. Indexer/Search handler 140 communicates with the CHCS 110 to provide search indexing and handle search queries as described hereinafter. Key Management Service (KMS) 150 provides authentication and cryptographic keys to clients 120 and 122, as well as to Indexer 140. To address the customer control of data within the collaboration sessions, indexer 140 and KMS 150 are within trust boundary 160, and are generally referred to as on-premise assets. On-premise assets such as KMS 150 and indexer 140 may comprise computing devices that are physically located under the control of the customer. The indexer/search handler 140 and the KMS 150 may be modules of the same server, or they may be on separate co-located servers. Additionally, the on-premise devices may be located at two different locations, as long as both locations and devices are physically under the control of the customer.

The online conference session may comprise voice, video, chat, desktop sharing, application sharing, and/or other types of data communication. Only two client devices are shown in FIG. 1, but any number of client devices may be included in system 100. Client devices 120 and 122 may take a variety of forms, including a desktop computer, laptop computer, mobile/cellular phone, tablet computer, Internet telephone, etc. CHCS 110 may be provided over any type of network (e.g., any combination of Internet, intranet, local area network (LAN), wide area network (WAN), wired network, wireless network, etc.) that connects computing devices, e.g., client devices 120 and 122, collaboration server 130, indexer 140, and KMS 150. CHCS 110 may be used, for example, to mediate transactions between client devices 120 and 122. CHCS 110 may also perform caching or other time/bandwidth saving techniques. It should be understood that in a web-based conference system, each device may communicate with the CHCS 110 through a browser application having one or more plug-ins that enable a web-based meeting, and allow for the transmission of data to the collaboration server 130, and the reception of data from the collaboration server 130 during a conversation.

Figure 2:
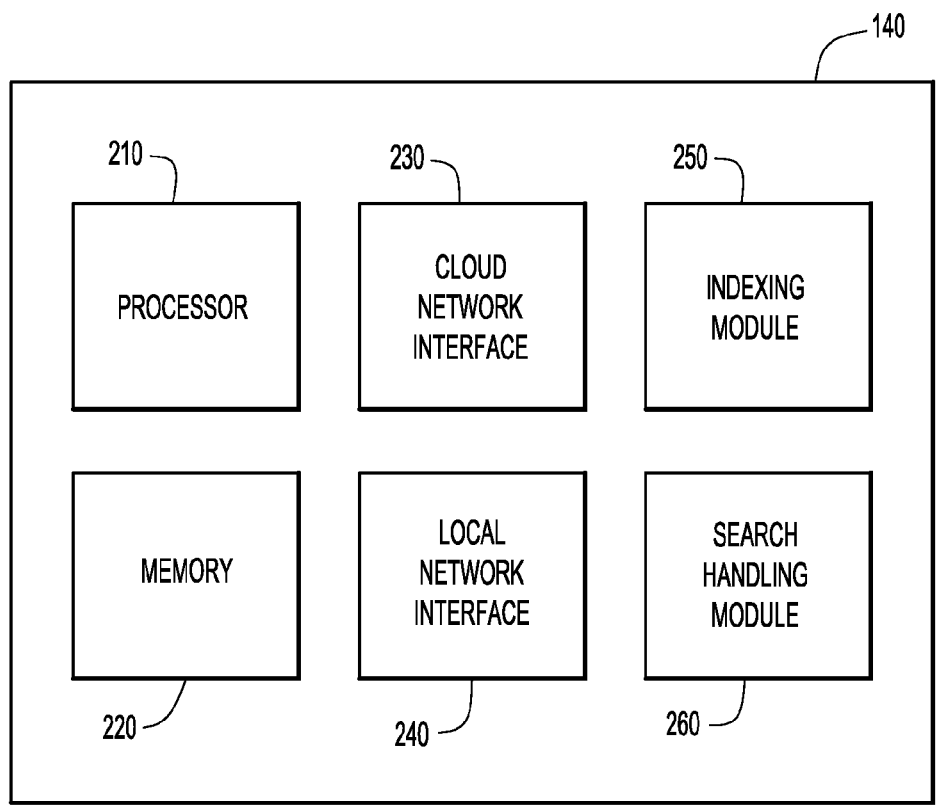
FIG. 2 is a block diagram of an on-premise search indexer/handler according to an example embodiment.

Referring now to FIG. 2, a simplified block diagram of indexer/search handler 140 is shown. Indexer 140 includes a processor 210 to process instructions relevant to an online collaboration session supported by the system 100, memory 220 to store a variety of data and software instructions (e.g., audio, video, control data, etc.). The indexer 140 also includes a cloud network interface unit (e.g., card) 230 to communicate with CHCS 110 and client devices 120 and 122. Indexer 140 further comprises a local network interface 240 to communicate securely within trust boundary 160, e.g., receiving cryptographic keys from KMS 150. The distinction between cloud network interface 230 and local network interface 240 may be purely logical, such that both network interfaces 230 and 240 may be part of the same physical network interface unit. Indexer 140 also includes indexing module 250 to perform the indexing of conversations and search handling module 260 to handle any search queries about the conversation. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
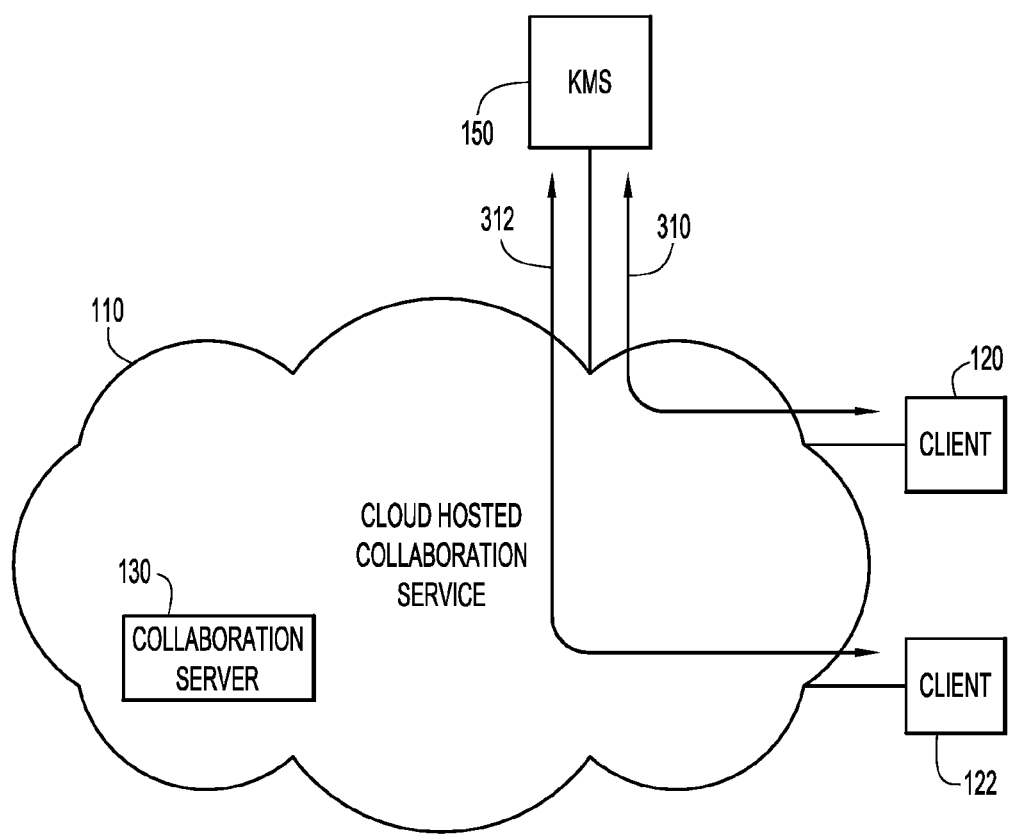
FIG. 3 is a block diagram of client devices setting up ephemerally secure channels with an on-premise key management service according to an example embodiment.

Referring now to FIG. 3, a simplified flow diagram of securing ephemerally secure channels is shown. In this exchange of messages, which may be a precursor to a collaboration session, clients 120 and 122 set up ephemerally secure communication channels 310 and 312, respectively. In one example, the KMS 150 is responsible for generating, distributing, and maintaining records of all cryptographic keys issued to any clients within a single trust boundary, such as a corporation. In some examples, the trust boundary may be pushed out to the service provider level. In another example, the KMS 150 acts as a client to the CHCS 110, so that it is able to receive messages from and send messages to client devices 120 and 122. The KMS 150 may authenticate itself to client devices 120 and/or 122 by signing its messages using a public certificate that has been issued by a mutually trusted certificate authority. The client devices 120 and 122 are aware of KMS 150, and may display details of the key management system involved in a conversation to the user, such as the common name (CN) from the KMS's public certificate.

In one example, client device 120 will establish a secure communication channel with the KMS 150 when it starts up a collaboration session by performing a signed Diffie-Hellman ephemeral key exchange in which messages are relayed trough the CHCS 110. Alternatively, an ephemerally secure channel may be created for each request in the conversation. The Diffie-Hellman exchange can be standard or elliptic curve based, or use any other method for securely exchanging a shared secret over an insecure communication channel. In order to prevent a man-in-the-middle attack, the signing of these exchange messages may include encrypting and signing all client-to-KMS messages with the public key of the KMS 150 and encrypting and signing all KMS-to-client messages with the private key of the KMS 150. Once the ephemerally secure messaging channels 310 and 312 are established, clients 120 and 122 may each use their respective channel for subsequent requests. Each request may include an authorization token that can be validated by the KMS 150, and which is different from any authorization tokens used for communications with the CHCS 110 in order to prevent the CHCS 110 from being able to replay authorization tokens to the KMS 150 and retrieve cryptographic keys.

Figure 4:
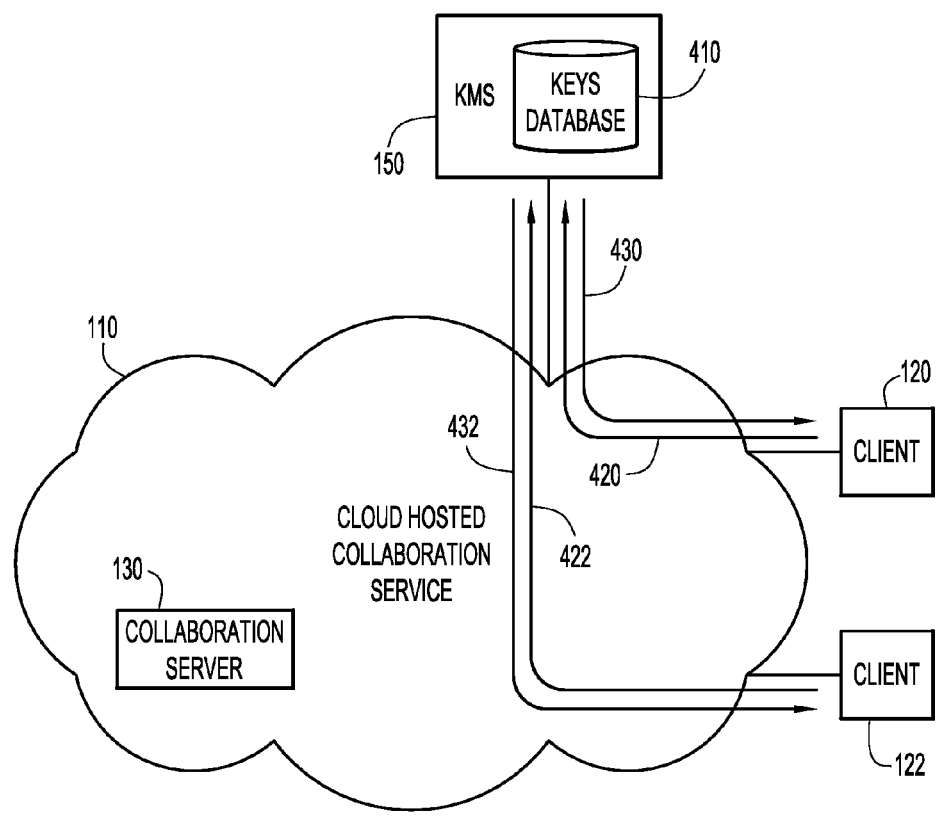
FIG. 4 is a block diagram of client devices securely receiving conversation keys from the on-premise key management service according to an example embodiment.

Referring now to FIG. 4, a simplified flow diagram of client devices securing conversation keys for a collaboration session is shown. KMS 150 includes a database 410 of cryptographic keys that are used as conversation keys. After establishing ephemerally secure channels as shown in FIG. 3, clients 120 and 122 send requests 420 and 422, respectively, for a conversation key. KMS server 150 retrieves or generates a cryptographic key for clients 120 and 122 to use as a conversation key, and sends the conversation key back in messages 430 and 432, respectively.

In one example, when client device 120 starts a collaboration session with an invitation to client 122, it notifies CHCS 110 of the invitation that is going to be sent. The CHCS 110 notifies the KMS 150, which generates a cryptographic key, associates it with the soon-to-be-established CHCS conversation, stores a copy of the key for subsequent use along with a list of authorized participants, and relays the conversation key through the ephemerally secured channels. According to one example, the conversation key is also associated with a conversation identifier. Once each client has received the conversation key, it can send symmetrically encrypted messages through the CHCS 110 to other conversation participants without concern that the message may be decrypted by the CHCS 110. Conversely, when client 122 receives the invitation to join a conversation, it sends a request 430 over its ephemerally secured CHCS channel to the KMS 150, along with its authorization token. Assuming the authorization token is valid for the requested conversation (i.e., client device 122 is an authorized participant), then the KMS 150 responds over the ephemerally secure channel with message 432 comprising the conversation key.

If a conversation member is added or removed after a conversation is established, the KMS 150 is notified of the change in participants. The KMS 150 can either add or revoke the authorization of the new or removed members in its database and rely on the CHCS to start or stop delivering messages to the new or removed members. Alternatively, the KMS 150 may generate a new conversation key, store the key and participant authorizations in its database, and distribute the new conversation key to the modified list of participants. Generating a new conversation key when a participant is removed from a conversation ensures that a malicious participant is unable to collude with the CHCS to continue to passively participate in a conversation after being removed.

Figure 5:
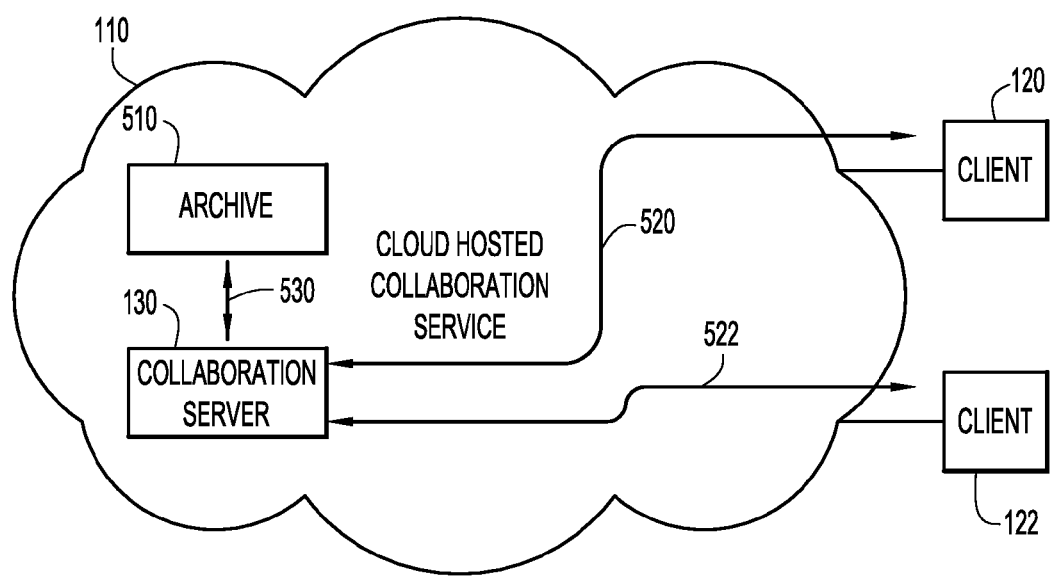
FIG. 5 is block diagram of client devices participating in a collaboration session according to an example embodiment.

Referring now to FIG. 5, a simplified block diagram of a CHCS archiving a conversation is now described. In one example, CHCS 110 includes an archive 510 for storing messages in any conversation that is facilitated by collaboration server 130. In this example, client 120 exchanges messages 520 with collaboration server 130, and client 122 exchanges messages 522 with collaboration server 130. Through messages 520 and 522, clients 120 and 122 participate in a collaboration session. Collaboration server 130 sends copies 530 of the messages from the collaboration session to be stored in archive 510. In one example, the archived messages are associated with the corresponding conversation identifier. Within the CHCS 110, the archive 510 stores encrypted messages with no access to the data within the encrypted message. If a client has access to retrieve a message from archive 510, it would also need the appropriate authorizations to access the conversation key from the KMS 150 in order to decrypt the archived message.

Figure 6:
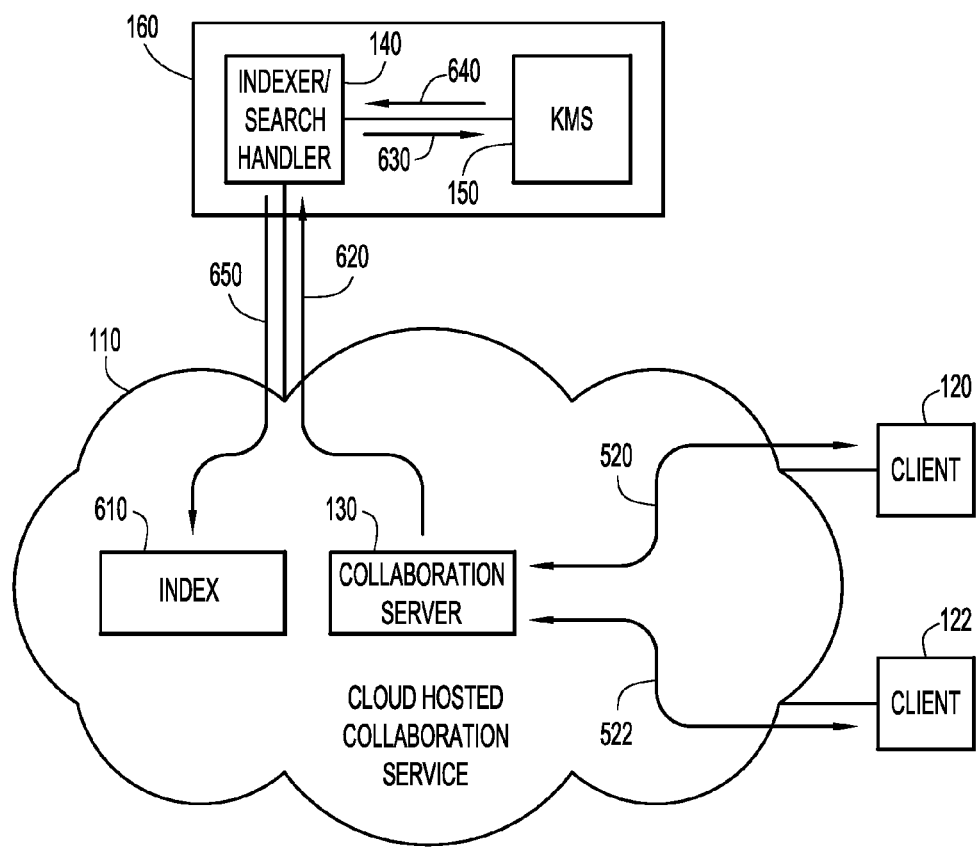
FIG. 6 is a block diagram of an on-premise search indexer operating on a copy of the collaboration session messages to index the collaboration session for later searching according to an example embodiment.

Referring now to FIG. 6, a simplified block diagram is now described for the operation of an on-premise indexer. To maximize scalability in one example, CHCS 110 maintains a search index 610 in the cloud. To ensure access control and privacy, a copy 620 of each message passed through the server 130 as part of a conversation is forwarded to indexer 140. In response to receiving message 620, indexer 140 sends a message 630 to KMS 150, through a private internal channel, requesting the conversation key to decrypt message 620. KMS 150 responds with message 640, which includes the corresponding conversation key. In one example, the corresponding conversation key is identified through the conversation identifier associated with message 620. Indexer 140 decrypts message 620, and extracts searchable tokens from the content. In the case of dictionary words that are extracted, the indexer 140 may optionally stem the words to their root form. Once a list of tokens is extracted, the indexer 140 may filter the tokens for a variety of reasons, e.g., stop-word lists.

In one example, the finalized list of searchable tokens is combined with a relatively large secret key provided by KMS 150, and passed through a hash-based message authentication code (HMAC) function. The resulting list of HMACs, along with the conversation identifier, is sent to the CHCS as message 650, where it is stored in index 610. The large secret key provided by KMS 150 functions in a similar manner to a cryptographic salt, in that it prevents "rainbow" table attacks. However, unlike a salt, the secret is meant to stay secret to prevent dictionary attacks on the tokens stored in index 610 of CHCS 110.

Figure 7:
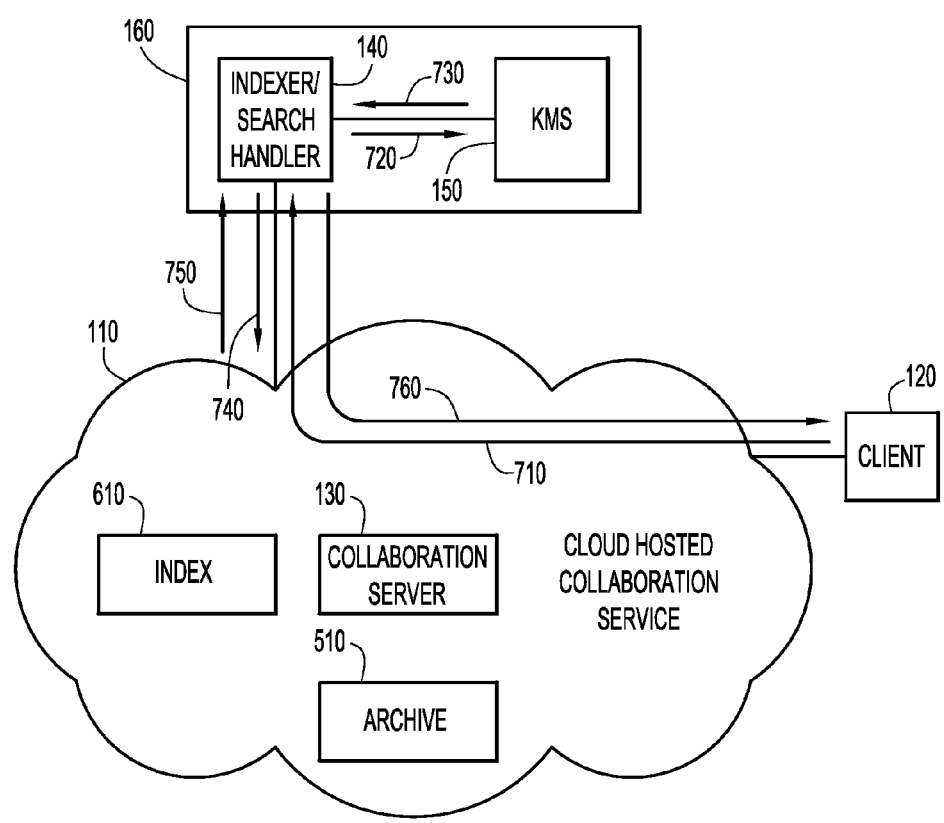
FIG. 7 is a block diagram of a client device searching the archives of the collaboration server according to an example embodiment.

Referring now to FIG. 7, a simplified flow diagram is described for the operation of an on-premise search handler. Client 120 sends a message 710 to search handler 140 that includes an encrypted search query. Search handler 140 may then perform the same steps on the search query that indexer 140 performs when it receives a conversation message. In other words, search handler 140 decrypts the search query, tokenizes it, optionally stems dictionary words, optionally filters the tokens, requests the large secret key from KMS 150 with message 720, receives the secret in message 730, combines the secret with each token, derives an HMAC for each token and secret combination, and sends the processed search query HMACs to the CHCS 110 as message 740. When the CHCS 110 receives message 740, it queries search index 610 for matches between the encrypted search query tokens and the encrypted conversation message tokens. If any tokens match, the corresponding conversation identifier is returned to search handler 140 in message 750. Additionally, the CHCS 110 may return the encrypted conversation retrieved from archive 510 as part of message 750. The search handler 140 then retrieves any conversation keys of the retrieved search results, combines the conversation key(s) and conversation identifier(s) (or archived conversation messages), and sends the search results back to client 120 as message 760.

In one example, client 120 may set up an ephemerally secure channel with search handler 140 in the same manner as described above with respect to the client 120 retrieving a conversation key. The search handler 140 may require the client 120 to send an authorization token that is different from any used for communications with the CHCS 110 to ensure that CHCS 110 is not able to break the encryption through a replay of the authorization tokens.

Figure 8:
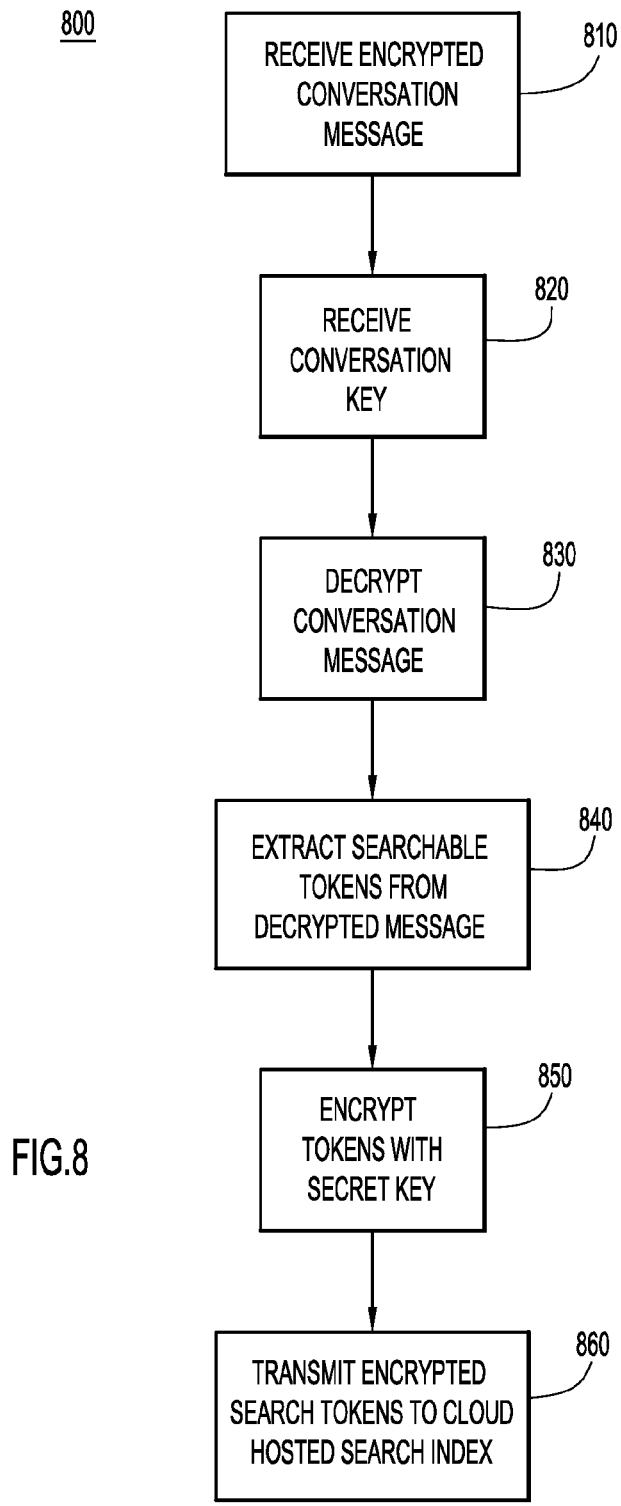
FIG. 8 is a flowchart depicting operations of an indexer processing a copy of an encrypted collaboration session according to an example embodiment.

Referring now to FIG. 8, an example flowchart of a process 800 for securely indexing a cloud hosted collaboration session is now described. In step 810, indexer 140 receives a copy of an encrypted conversation message. After receiving the conversation key in step 820, the indexer 140 decrypts the conversation message in step 830. In step 840, the indexer extracts searchable tokens (e.g., key words) from the decrypted message. Step 840 may include steps of stemming words to their root words and/or filtering words, e.g., against a list of stop-words too common to be useful in search results. Each of the tokens are encrypted with a secret key in step 850, and transmitted for storage in a cloud-hosted storage index at step 860.

In one example, the extracted tokens are encrypted with a secret key that is received from the KMS 150. Alternatively, the indexer 140 may maintain a secret to be used on any conversations that it is assigned to index and/or search. The secret key may be the same for a plurality of conversations involving a single trust boundary, such as a single corporation. Alternatively, a new secret key may be generated for each separate conversation.

Figure 9:
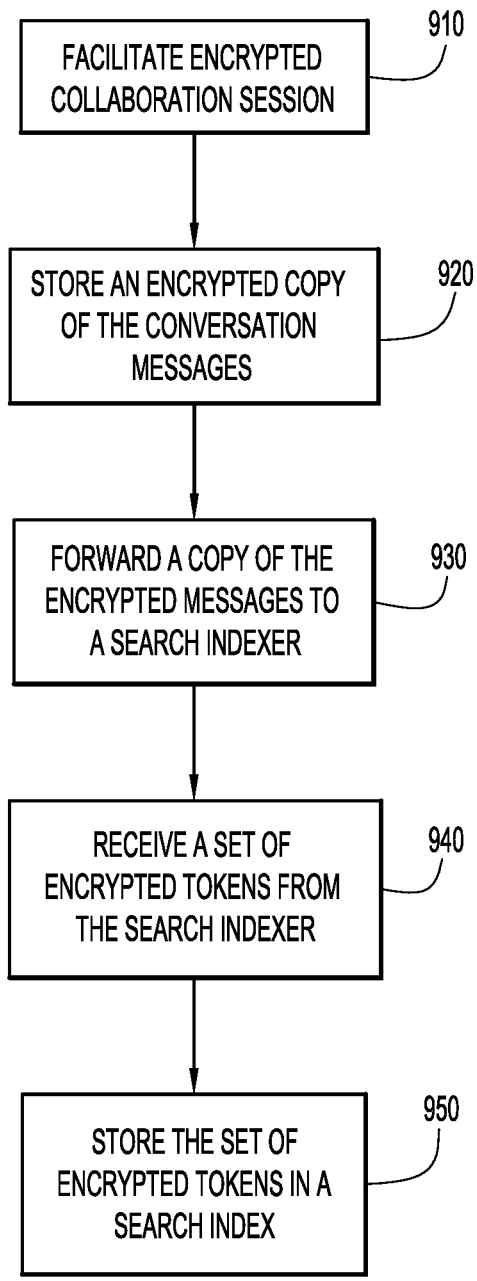
FIG. 9 is a flowchart depicting operations of a cloud hosted collaboration server facilitating a searchable, encrypted collaboration session according to an example embodiment.

Referring now to FIG. 9, an example flowchart of a process 900 for searching encrypted archives of conversations is now described. In step 910, the CHCS 110 facilitates an encrypted collaboration session. As part of facilitating the collaboration session, at step 920, the CHCS 110 stores an encrypted copy of each of the messages that passes through the CHCS 110 as part of the conversation. The CHCS 110 forwards a copy of each of the encrypted messages to search indexer 140 in step 930. In step 940, the CHCS 110 receives a set of encrypted tokens corresponding from the search indexer 140 and stores the encrypted tokens in a search index at step 950. The encrypted messages and encrypted tokens may each be associated and stored with an unencrypted conversation identifier.

Figure 10:
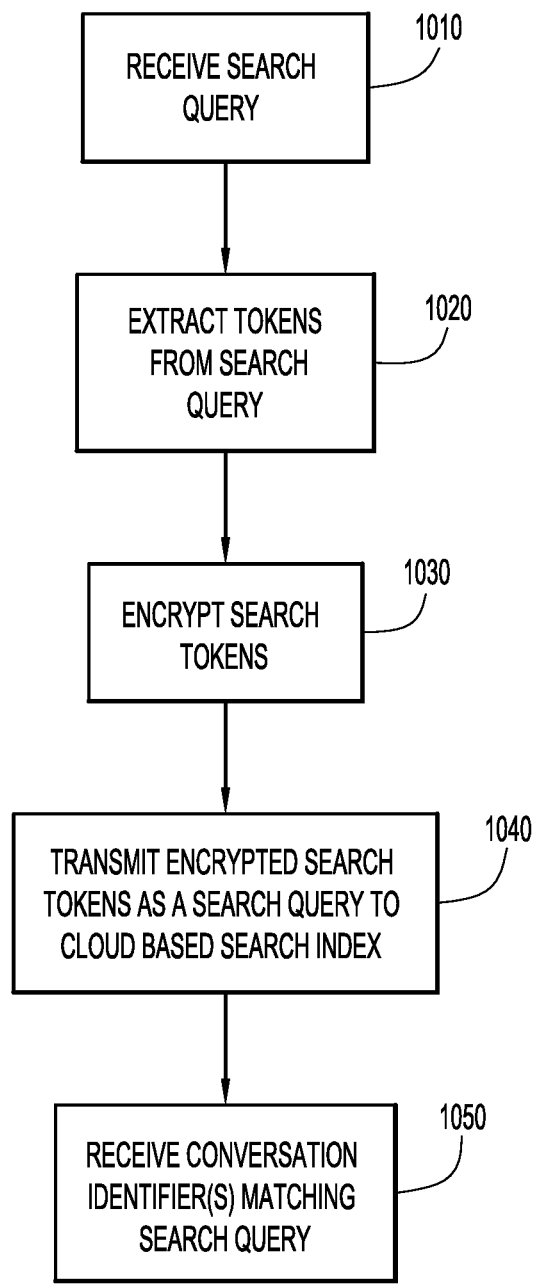
FIG. 10 is a flowchart depicting operations of a search handler processing a search request according to an example embodiment.

Referring now to FIG. 10, an example flowchart of a process 1000 for handling search requests is described. In step 1010, the search handler receives a search query, and extracts tokens from the search query at step 1020. The search handler encrypts the search query tokens at step 1030 with the same secret key that the search indexer used to encrypt the tokens extracted from the conversation messages. In step 1040, the search handler transmits the encrypted search query tokens as a search query on a cloud-hosted search index, and receives the matching conversation identifier(s) as search results in step 1050. The search results may also include encrypted copies of the conversation.

In summary, the techniques presented herein provide for hybrid cloud/on-premise index and search capability for an end-to-end secure cloud hosted collaboration solution. This approach involves on-premise indexing and search handling, while relying on the cloud for persistent storage and search of the index. This allows the on-premise computing power and costs to scale with the volume of searches rather than the volume of content. The end-to-end encryption maintains the confidentiality of the conversations, and the encryption is only removed for search purposes within the on-premise trust boundary.

In one example, the techniques presented herein provide for a method comprising receiving a copy of an encrypted message from a cloud hosted collaboration service. The encrypted message has been encrypted with a conversation key. The method further comprises receiving the conversation key from an on-premise key management service, and decrypting the encrypted message with the conversation key. A set of tokens are extracted from the decrypted message, and subsequently encrypted with a secret key, different than the conversation key, to generate a first set of encrypted tokens. The first set of encrypted tokens is transmitted for storage in a search index on the cloud hosted collaboration service.

In another example, the techniques presented herein provide for a search indexer comprising a cloud network interface configured to receive a copy of a message from a cloud hosted collaboration service encrypted with a conversation key. The indexer also comprises a local network interface configured to receive the conversation key from an on-premise key management service. The indexer also includes a processor configured to decrypt the conversation message with the conversation key and extract a set of tokens from the decrypted message. The processor is further configured to encrypt the set of tokens with a secret key that is different than the conversation key to generate a first set of encrypted tokens, which is then transmitted by the cloud network interface for storage in a search index on the cloud hosted collaboration service.

In a further example, the techniques presented herein provide for a method for a cloud-hosted collaboration service to provide search indexing for an end-to-end encrypted collaboration session without decrypting the messages on the cloud. The method comprises facilitating the collaboration session comprising a plurality of encrypted message and storing the plurality of messages in association with a conversation identifier. A copy of the plurality of messages is transmitted along with the conversation identifier to a search indexer. A first set of encrypted tokens associated with the conversation identifier is received from the search indexer, and stored in a search index in association with the conversation identifier.

The above description is intended by way of example only. Various modifications and structural changes may be made therein without departing from the scope of the concepts described herein and within the scope and range of equivalents of the claims.

What is claimed is:

1. A method comprising:
   at a collaboration server, facilitating a collaboration session comprising a plurality of encrypted messages without decrypting the plurality of encrypted messages;
   storing the plurality of encrypted messages in association with a conversation identifier;
   transmitting a copy of the plurality of encrypted messages and the conversation identifier over a network to a search indexer;
   receiving, from the search indexer, a first set of encrypted tokens associated with the conversation identifier; and
   storing the first set of encrypted tokens in an index in association with the conversation identifier.

2. The method of claim 1, further comprising:
   receiving over the network a second set of encrypted tokens from a search handler;
   comparing the second set of encrypted tokens to the index, and
   if at least one of the second set of encrypted tokens matches at least one of the first set of encrypted tokens, transmitting the conversation identifier to the search handler.

3. The method of claim 2, further comprising transmitting the plurality of encrypted messages associated with the conversation identifier to the search handler.

4. The method of claim 1, wherein the first set of encrypted tokens and the second set of encrypted tokens comprise a plurality of hash-based message authentication codes (HMACs).

5. The method of claim 1, wherein facilitating the collaboration session comprises:
   receiving an initiation message for the collaboration session;
   sending a notification of the collaboration session to an on-premise key management service, the notification instructing the on-premise key management service to generate a conversation key for the collaboration session.

6. The method of claim 1, wherein storing the plurality of encrypted messages comprises locally caching the plurality of encrypted messages.

7. The method of claim 1, wherein storing the plurality of encrypted messages comprises archiving the plurality of encrypted messages in a cloud-based storage archive.

8. An apparatus comprising:
   a network interface unit configured to enable communications over a network between a plurality of clients of a collaboration session, the collaboration session comprising a plurality of encrypted messages; and
   a processor configured to:
      facilitate the collaboration session without decrypting the plurality of encrypted messages;
      store the plurality of encrypted messages in association with a conversation identifier;
      transmit, via the network interface unit, a copy of the plurality of encrypted messages and the conversation identifier to a search indexer;
      receive from the search indexer, via the network interface unit, a first set of encrypted tokens associated with the conversation identifier; and
      store the first set of encrypted tokens in an index in association with the conversation identifier.

9. The apparatus of claim 8, wherein the processor is further configured to:
   receive, via the network interface unit, a second set of encrypted tokens from a search handler;
   compare the second set of encrypted tokens to the index, and
   if at least one of the second set of encrypted tokens matches at least one of the first set of encrypted tokens, cause the network interface unit to transmit the conversation identifier to the search handler.

10. The apparatus of claim 9, wherein the processor is further configured to transmit, via the network interface unit, the plurality of encrypted messages associated with the conversation identifier to the search handler.

11. The apparatus of claim 8, wherein the first set of encrypted tokens and the second set of encrypted tokens comprise a plurality of hash-based message authentication codes (HMACs).

12. The apparatus of claim 8, wherein the processor is configured to facilitate the collaboration session by:

receiving, via the network interface unit, an initiation message for the collaboration session;

cause the network interface unit to send a notification of the collaboration session to an on-premise key management service, the notification instructing the on-premise key management service to generate a conversation key for the collaboration session.

13. The apparatus of claim 8, wherein the processor is configured to store the plurality of encrypted messages by locally caching the plurality of encrypted messages.

14. The apparatus of claim 8, wherein the processor is configured to store the plurality of encrypted messages by archiving the plurality of encrypted messages in a cloud-based storage archive.

15. One or more non-transitory computer readable storage media encoded with software comprising executable instructions and when the software is executed operable to cause a processor to:

facilitate a collaboration session comprising a plurality of encrypted messages without decrypting the plurality of encrypted messages;

store the plurality of encrypted messages in association with a conversation identifier;

transmit a copy of the plurality of encrypted messages and the conversation identifier over a network to a search indexer;

receive, from the search indexer, a first set of encrypted tokens associated with the conversation identifier; and store the first set of encrypted tokens in an index in association with the conversation identifier.

16. The computer readable media of claim 15, further comprising instructions operable to cause the processor to:

receive a second set of encrypted tokens from a search handler;

compare the second set of encrypted tokens to the index, and if at least one of the second set of encrypted tokens matches at least one of the first set of encrypted tokens, transmit the conversation identifier to the search handler.

17. The computer readable media of claim 16, further comprising instructions operable to cause the processor to transmit the plurality of encrypted messages associated with the conversation identifier to the search handler.

18. The computer readable media of claim 15, further comprising instructions operable to cause the processor to facilitate the collaboration session by:

receiving an initiation message for the collaboration session;

sending a notification of the collaboration session to an on-premise key management service, the notification instructing the on-premise key management service to generate a conversation key for the collaboration session.

19. The computer readable media of claim 15, further comprising instructions operable to cause the processor to store the plurality of encrypted messages by locally caching the plurality of encrypted messages.

20. The computer readable media of claim 15, further comprising instructions operable to cause the processor to store the plurality of encrypted messages by archiving the plurality of encrypted messages in a cloud-based storage archive.

* * * * *